March 31, 1942.  H. MOREAU  2,278,113
GALVANOMETER CONTACT DEVICE
Filed Oct. 30, 1936  2 Sheets-Sheet 1

BURNER CONTROL

ALARM AND STOPPING

INVENTOR:
HENRI MOREAU
BY Haseltine, Lake & Co.
ATTORNEYS

March 31, 1942.  H. MOREAU  2,278,113
GALVANOMETER CONTACT DEVICE
Filed Oct. 30, 1936   2 Sheets-Sheet 2

INVENTOR:
HENRI MOREAU
BY Haseltine, Lake & Co.
ATTORNEYS

Patented Mar. 31, 1942

2,278,113

UNITED STATES PATENT OFFICE 2,278,113

GALVANOMETER CONTACT DEVICE

Henri Moreau, Paris, France

Application October 30, 1936, Serial No. 108,387
In France November 6, 1935

3 Claims. (Cl. 200—56)

This invention relates to galvanometer contact devices in which one or more pointers come, in some of their angular positions, into contact with a contact piece or a conducting surface, in order to close circuits for the production of various effects. Galvanometers of this type are particularly used in apparatus for the automatic control of variables, such as temperatures.

In these apparatus, the angular position of the pointer which corresponds to a definite energization of the galvanometer can express the values of the variables to be controlled; it suffices to provide suitable graduations. For deriving profit from this advantage, it is necessary that the pointer, after production of a contact which has determined an adjusting effect, should be released in order that its angular position should indicate the values of the variables to be controlled.

In the various control apparatus previously proposed by the applicant and utilizing galvanometers responsive to extremely small currents, the pointer carries one or two sharp points which come in contact with fixed keys. In case a single key is used, it is possible, through a contrivance already proposed by the applicant, to obtain direct reading on a graduation located on one and the same side of the key. It suffices, in fact, to reverse the energization of the galvanometer which has produced the contact of the pointer, so that the latter moves away from the contact piece proportionally to the effect which had previously moved it towards said contact piece. But, when the pointer must rock between two contact pieces the contact of which must produce a definite effect, the reading sets down a problem of which the present invention gives a solution applicable moreover to all contact galvanometers.

For that purpose, the invention is characterized by the fact that the contact pieces or contact surfaces with which the pointer must come in engagement, are movable relatively to the path followed by the pointer so as to come on said path or to move away therefrom, the movement of these contact pieces or contact surfaces being initiated by electric or electromagnetic effects combined or not with mechanical means. It will be seen that the invention thus defined in its principle, allows of obtaining, with a single direct reading pointer, as many peculiar instantaneous effects as may be required, since as many contact pieces as necessary can be arranged in the path followed by said pointer. Up to now, direct reading galvanometers had been devised in which the pointer, movable opposite conducting surfaces, was periodically lifted for coming in contact with the conducting surface which corresponded to its angular position. A first inconvenience of these apparatus results from the fact that they cannot have an instantaneous action, since the pointer can oscillate without producing any effect between two consecutive lifting movements. Another serious inconvenience occurs when the pointer, having received, from any cause whatever, a rapid angular displacement, is lifted after it has passed the conducting surface the contact of which was to produce the correcting effect.

If, for remedying this latter inconvenience, on the conducting surfaces are provided projections or stops between which the pointer must be retained, the apparatus is no longer of the direct reading type, and, as adherences are always to be feared between the pointer and said stops, the sensitiveness of the apparatus is affected.

The invention applied to apparatus provided with conducting surfaces and of the type just described, allows of remedying this inconvenience. In fact, it suffices to render the conducting surfaces movable and to mechanically associate them in such a manner that the stop provided on one of them is moved away when the stop on the other is located in the path followed by the pointer, the reversal of movement of the conducting surfaces being, for instance, electromagnetically effected by the contact of the pointer when the latter is lifted up to the conducting surface opposite which it is located. The pointer is thus free to move, for reading purposes, in the direction which moves it towards the stop of the conducting surfaces with which it has come in engagement.

In the accompanying drawings forming part hereof,

Throughout the views, the same references indicate the same or like parts.

The galvanometer used is of the crossed coil type. It might be of the opposed straight coil type, or of the single coil type energized between the variable potential points of a Wheatstone bridge, or any other balanced circuit comprising resistances variable with the temperatures to be controlled.

Figure 1:
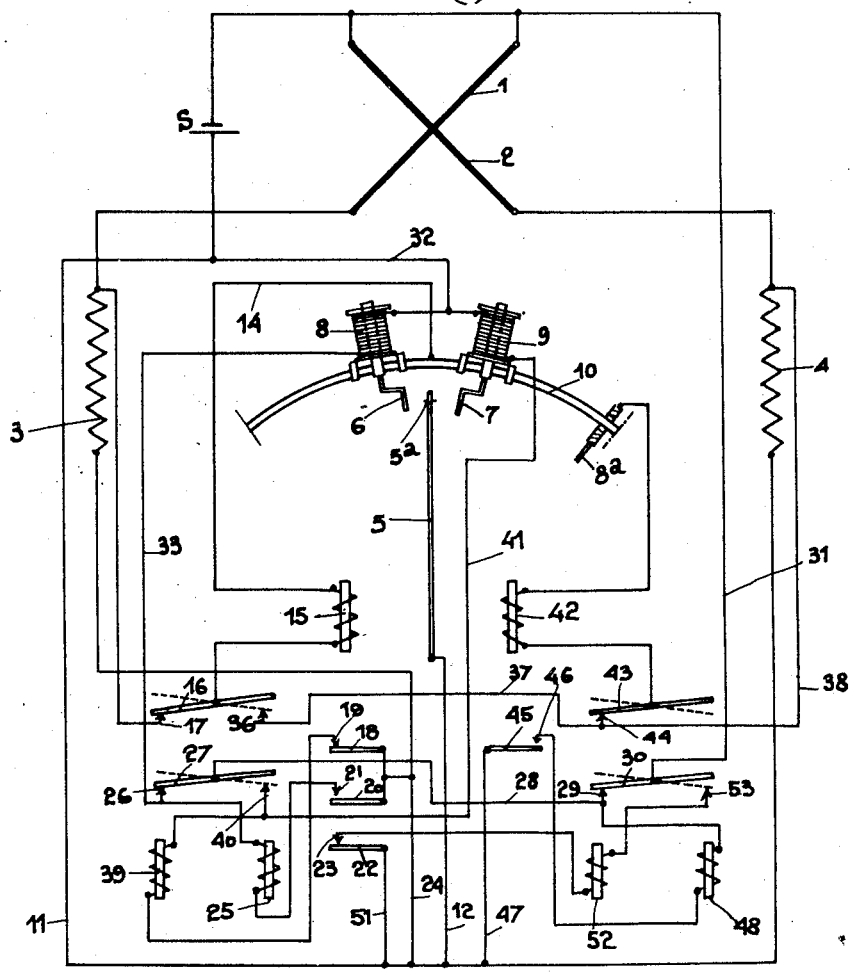
Fig. 1 is a diagram of an installation for controlling temperature according to the invention.
Figure 3:
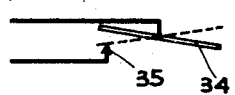
Fig. 3 is another view of the same showing a closed contact condition.
Figure 4:
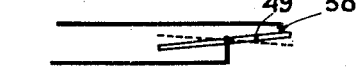
Fig. 4 illustrates details relating to the movable contacts and their actuating means.
Figure 2:
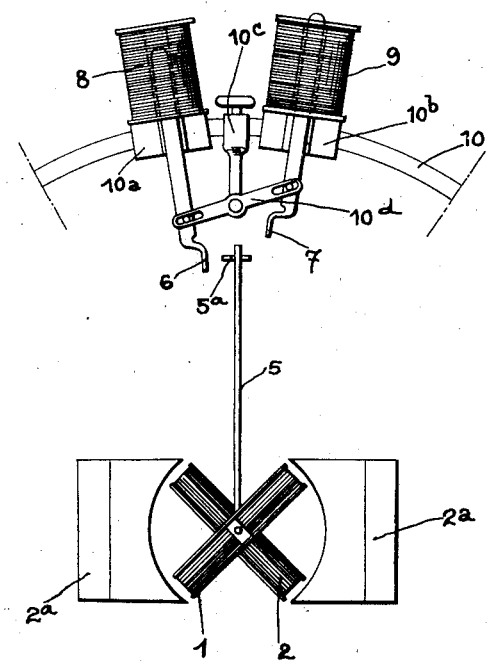
Fig. 2 is a contact detail showing an open contact condition.

In the example shown, the frames or coils 1 and 2 are assembled for pivoting about a vertical axis between the poles 2a (Fig. 2) of a magnet, at the manner well known in the galvanometers of the crossed coils type. The needle 5 is supported upon the whole of the coils and rotates with the latter. The coils 1 and 2 of the galvanometer are connected in series with a resistance 3 and a resistance 4, respectively, between the poles of a source of current supply S. The resistance 3 being for instance variable with the temperature, its variations relatively to the resistance 4 determine the angular displacement, in one direction or the other, of the pointer 5 connected to the moving system of the coils. When the two resistances 3 and 4 are equal, the pointer is at zero. This zero can moreover be located at any desired point of the graduation by adjustment of resistance 4 relatively to resistance 3, when the latter is at the value of adjustment adopted for the temperature to be controlled.

In the path followed by the points 5a of the pointer 5 are arranged contacts pieces 6, 7 and 8a. The contact pieces 6 and 7 are respectively carried by the movable armatures of electromagnets 8 and 9 adjustable in position on a support 10 arcuated concentric with the pivot of the pointer and with which the contact pieces 6 and 7 are in permanent electric contact. The armatures are guided into slides provided on the bases 10a and 10b mounted on the support 10. An electric connection is thus ensured between the contacts 6 and 7 and the support 10. The armatures are coupled by means of a rocking member 10d pivoted on a bracket 10c secured in the suitable position on the support 10. When an armature is attracted, the other is moved away from its coil 8 or 9. The contact piece 8a is movable on the support 10, but is insulated from the latter.

The operation of the apparatus is as follows:

The pointer being at zero between the contact pieces 6 and 7, if the temperature to be controlled lowers, the point 5a comes in engagement with contact piece 6. A circuit is closed through one of the poles of the source of current supply S, wire 11, wire 12, pointer 5, contact piece 6, support 10, wire 14, relay 15, contact 16—17, coil 1 and the other pole of the source of current supply S.

The resistance 3 is short-circuited by the relay 15 of small ohmic resistance, this producing positive contact at 5a—6. The relay 15, by being energized, closes the contacts 18—19, 20—21, 22—23. A first circuit is closed through one of the poles of the source of current supply S, wire 11, wire 24, contact 20—21, relay 25, contact 26—27, wire 28, contact 29—30, wire 31 and the other pole of the source of current supply S.

A second circuit is closed through one of the poles of the source of current supply S, wire 32, electromagnet 8, wire 33, contact 26—27, wire 28, contact 29—30, wire 31 and the other pole of the source of current supply S.

The relay 25 and electromagnet 8 are energized. Relay 25, by being energized, moves the rockers 16 and 27 and 34 to the positions they occupy as shown in dotted lines in the drawings. Relay 15 is de-energized and contacts 18—19, 20—21, 22—23 are opened. The contact closed at 34—35 puts in action the servo-motor which is to start the effects (burners for instance) for raising the temperature to its adjusted value.

The energization of electromagnet 8 has for effect to move contact piece 6 away from the path followed by point 5a, so that the pointer 5 is free to move towards the left and allows reading on a suitable graduation. But, the movable armature which carries contact piece 6 being mechanically associated with that carrying contact piece 7, by the rocking member 10d (Fig. 2), contact piece 7 is placed in the path followed by the point 5a. The energization of electromagnet 9 will have for effect to retract contact piece 7 and to restore contact piece 6 in the path followed by point 5a, in the conditions explained hereinafter.

The temperature, by rising, restores the pointer towards the position corresponding to the adjusted value. If this value is exceeded, the contact takes place at 5a—7 and a circuit is closed through one of the poles of the source of current supply S, wires 11—12, pointer 5, contact 5a—7, support 10, wire 14, relay 15, contact 16—36, wires 37—38, coil 2 and the other pole of the source of current supply S. The resistance 4 is short-circuited by relay 15, this producing positive contact at 5a—7 and positive energization of relay 15. Contacts 18—19, 20—21, 22—23 close. A first circuit is closed through one of the poles of the source of current supply S, wires 11—24, contact 18—19, relay 39, contact 40—27, wire 28, contact 29—30, wire 31 and the other pole of the source of current supply S.

A second circuit is closed through one of the poles of the source of current supply S, wire 32, electromagnet 9, wire 41, contact 40—27, wire 28, contact 29—30, wire 31, and the other pole of the source of current supply S.

The relay 39 and electromagnet 9 are energized.

The energization of relay 39 has for effect to restore the rockers, 16, 27 and 34 to the positions they occupy as shown in full lines in the diagram. Contact is opened at 34—35 and the burners previously put in action are stopped. The energization of electromagnet 9 retracts contact piece 7 and restores contact piece 6 in the path followed by point 5a. The pointer is free towards the left for reading purposes. If the temperature does not come back to its adjusted value, the pointer engages with contact piece 8a. A circuit is closed through one of the poles of the source of current supply S, wires 11—12, contact 5a—8, relay 42, contact 43—44, wire 38, coil 2 and the other pole of the source of current supply S.

The resistance 4 is short-circuited by the relay 42 of small ohmic resistance. Positive contact occurs at 5a—8a and relay 42, by being energized, closes the contact at 45—46.

A circuit is closed through one of the poles of the source of current supply S, wires 11—47, contact 45—46, relay 48, contact 29—30, wire 31 and the other pole of the source of current supply S.

Relay 48, by being energized, restores the rockers 43, 30 and 49 to the positions they occupy as shown in dotted lines in the diagram. A contact is closed at 49—50 for releasing an alarm signal and stopping, if need be, other burners. The contact is opened at 45—46 for releasing relay 48. The temperature then rapidly lowers, its value being expressed at every instant by pointer 5 the movement of which is free up to contact piece 6. If the temperature lowers beyond its adjusted value, contact is closed at 5a—6 by producing the effects already indicated and particularly the retraction of contact piece 6, the descent of contact piece 7 in the path followed by the pointer and the energization of relay 15 which closes the contact at 22—23.

A circuit is closed through one of the poles of the source of current supply S, wires 11—51, contact 22—23, relay 52, contact 53—30, wire 31 and the other pole of the source of current supply S. Relay 52, by being energized, restores the rockers 43, 30 and 49 to the positions they occupy as shown in full lines in the diagram. Contact piece 8 is then active and ready to act as already explained, when the pointer will come in engagement with it.

It is obvious that an alarm or emergency contact piece might also be provided beyond contact piece 6 for accelerating the raising of the temperature when this is necessary.

As already stated, one of the advantages or industrial results of the invention is to allow reading whatever may be the number of contact pieces interposed in the path followed by the pointer. Some of these contact pieces being electromagnetically moved, and others being moved by mechanical or electric connection with the first ones, the invention is applicable to control apparatus in which the successive contacts of the pointer with one and the same contact piece can produce different effects, and particularly to those described in the French patent dated October 7, 1935, for "Improvements in automatic regulators of various effects and particularly in temperature regulators" in the name of the applicant.

What I claim as my invention and desire to secure by Letters Patent is:

1. In a galvanometer, a pointer, contact points on said pointer, conducting contact pieces adapted to close electric circuits when they are engaged by said points, electromagnets, having movable armatures which support said contact pieces for the electromagnetic control of said armatures, in order to move the contact pieces relatively to the paths followed by the contact points, and means for moving said electromagnets parallel to the paths followed by said contact points.

2. In a galvanometer, in combination, a pointer, contact points on said pointer, conducting contact pieces adapted to close electric circuits when they are engaged by said points, movable means for supporting said contact pieces, means for connecting said contact pieces so that the displacements of one of them relatively to the path followed by the points imparts displacements to the other contact pieces, and means for electromagnetically controlling the contact pieces at will.

3. In a device of the class described, in combination, a condition responsive element movable along a predetermined path, an electric circuit, a switch controlling said electric circuit, said switch having a member projecting into the path of movement of said element, means for instantly withdrawing said member from the path of said element upon engagement of said element with said member, and means for manually positioning said switch to cause said member to be engaged by said element at various positions of said element.

HENRI MOREAU.